United States Patent
Tripathi et al.

(10) Patent No.: US 9,934,249 B2
(45) Date of Patent: Apr. 3, 2018

(54) SYSTEMS AND METHODS FOR CONTEXT-AWARE AND PERSONALIZED ACCESS TO VISUALIZATIONS OF ROAD EVENTS

(71) Applicant: Xerox Corporation, Norwalk, CT (US)

(72) Inventors: Abhishek Tripathi, Bangalore (IN); Avinash Sharma, Bangalore (IN); Anirban Mondal, Bangalore (IN); Kuldeep Yadav, Haryana (IN); Nischal Murthy Piratla, Fremont, CA (US)

(73) Assignee: CONDUENT BUSINESS MACHINES SERVICES, LLC, Dallas, TX (US)

( * ) Notice: Subject to any disclaimer, the term of this patent is extended or adjusted under 35 U.S.C. 154(b) by 418 days.

(21) Appl. No.: 14/294,193

(22) Filed: Jun. 3, 2014

(65) Prior Publication Data
US 2015/0347478 A1    Dec. 3, 2015

(51) Int. Cl.
G06F 17/30    (2006.01)
G06F 7/00    (2006.01)

(52) U.S. Cl.
CPC .. *G06F 17/30241* (2013.01); *G06F 17/30327* (2013.01); *G06F 17/30528* (2013.01); *G06F 17/30551* (2013.01); *G06F 17/30554* (2013.01)

(58) Field of Classification Search
CPC ........ G06F 17/30241; G06F 17/30327; G06F 17/30554; G06F 17/30551; G06F 17/30528
See application file for complete search history.

(56) References Cited

U.S. PATENT DOCUMENTS

| | | | |
|---|---|---|---|
| 6,381,605 B1* | 4/2002 | Kothuri | G06F 17/30327 707/100 |
| 8,024,330 B1* | 9/2011 | Franco | G06F 17/30 707/724 |
| 2002/0151315 A1* | 10/2002 | Hendrey | H04W 64/00 455/466 |
| 2003/0171870 A1* | 9/2003 | Gueziec | G01C 21/26 701/423 |

(Continued)

OTHER PUBLICATIONS

Waze, https://web.archive.org/web/20130707105758/http://world.waze.com:80/faq/, Jul. 7, 2013, 3 pp. (Year: 2013).*

*Primary Examiner* — Marc S Somers
(74) *Attorney, Agent, or Firm* — Jones Robb PLLC

(57) ABSTRACT

The present disclosure is directed to systems and methods for context-aware and personalized access to data corresponding to an event. The data is related to multiple predefined parameters including a location, date, time, and a classifier representing a status or an impact intensity for the event. The method includes receiving the data and an event type for the data. The event type is selected from multiple predefined event types. The method also includes creating a hierarchical data structure configured to spatially index the data based on the selected event type. The hierarchical data structure includes a node representing the selected event type. The node is augmented using a linked list for referring to the data to be stored in a database. The node is associated with a frequency of occurrence of the selected event type.

24 Claims, 9 Drawing Sheets

(56) References Cited

U.S. PATENT DOCUMENTS

| | | | |
|---|---|---|---|
| 2005/0071757 A1* | 3/2005 | Ehrich | G06F 17/3089 715/234 |
| 2005/0222978 A1* | 10/2005 | Drory | G06F 17/30241 707/3 |
| 2008/0183511 A1* | 7/2008 | Handler | G06Q 10/02 705/5 |
| 2009/0204597 A1* | 8/2009 | Mani | G06F 17/3087 707/5 |
| 2009/0209233 A1* | 8/2009 | Morrison | G08G 1/096716 455/411 |
| 2010/0070160 A1* | 3/2010 | Haatainen | G01C 21/32 701/533 |
| 2013/0063282 A1* | 3/2013 | Baldwin | B61L 29/282 340/941 |
| 2015/0317901 A1* | 11/2015 | Hegemann | G08G 1/0112 701/117 |

* cited by examiner

SYSTEMS AND METHODS FOR CONTEXT-AWARE AND PERSONALIZED ACCESS TO VISUALIZATIONS OF ROAD EVENTS

TECHNICAL FIELD

Some of the disclosed embodiments relate to information systems, and more particularly, to systems and methods for context-aware and personalized access to visualizations of road events.

BACKGROUND

Driving safety is significantly dependent on road conditions or road events, such as lighting conditions (e.g., street lighting, daylight, etc.), road surface conditions (e.g., potholes, speed bumps, road maintenance work, etc.), weather conditions (e.g., rainfall, snowfall, etc.), natural phenomena (e.g., floods, landslides, fallen trees, etc.), human activities (e.g., crowd protests, traffic jams, road accidents, etc.), and so on. For example, suddenly encountering a pothole or a speed bump while driving may lead to vehicle damage or even a fatal accident. The seriousness of this issue is exacerbated by poor lighting conditions (e.g., at night, during foggy conditions, etc.), and by difficult weather conditions (e.g., tropical rain storms, snow storms, snow accumulation, etc.). These types of conditions may make it more difficult for drivers to detect potholes, speed bumps, road maintenance work, or similar road events while driving.

SUMMARY

Few of the road events, such as speed bumps, planned road maintenance work, etc., are typically planned or decided on a priori basis; which make it relatively easy to keep commuters informed about their locations and the nature of obstructions (e.g., height of a speed bump). However, certain events, which are dynamic and ad hoc in nature, can cause considerable changes in road events, thereby causing serious problems for the commuters. Examples include road accidents, potholes, water logging on roads due to sudden rainfall, broken water pipes, obstructions due to snowfall, etc. In contrast to the planned road maintenance work, the dynamic and ad hoc nature of such events makes it extremely challenging to keep the commuters informed about these events.

Some of the existing approaches including FixMyStreet, Ushahidi, and StreetBump platforms use crowdsourcing to receive inputs from local residents about the dynamic and ad-hoc events in a particular location. However, these approaches fail to reproduce the received inputs in a context-aware and personalized manner. Additionally, these approaches involve significantly high computational complexity with increasing user participation, thereby causing an increase in maintenance cost and data access time for on-demand information requests. Moreover, the existing approaches lack ability to encourage or improve user participation.

It may therefore be beneficial to provide a system that facilitates receipt of on-demand information about the ad-hoc road conditions in real-time, context-aware, and personalized manner.

One exemplary embodiment includes a method for context-aware and personalized access to data corresponding to an event. The data is related to multiple predefined parameters including a location, date, time, and a classifier representing a status or an impact intensity for the event. The method includes receiving the data and an event type for the data. The event type is selected from multiple predefined event types. The method also includes creating a hierarchical data structure configured to spatially index the data based on the selected event type. The hierarchical data structure includes a node representing the selected event type. The node is augmented using a linked list for referring to the data to be stored in a database. The node is associated with a frequency of occurrence of the selected event type.

Another exemplary embodiment includes a method for providing context-aware and personalized access to data corresponding to an event. The method includes receiving a request to access the data and at least one event type selected from multiple predefined event types. The request is associated with a user. The method also includes traversing an R-tree spatial index including a plurality of nodes that represent at least one event type from the multiple predefined event types. The method further includes determining a node corresponding to the selected at least one event type among the plurality of nodes. The determined node includes a linked list referring to the requested data located in a database. The method also includes accessing the requested data associated with the determined node.

Yet another exemplary embodiment includes a device for providing context-aware and personalized access to data corresponding to an event. The device includes a database and an event processing and visualization engine (EPV engine). The database includes membership data for a user, at least one map, and event profiles. The EPV engine is configured to exchange the data corresponding to an event type selected from multiple predefined event types based on a user input. The data is related to a plurality of predefined parameters including a location, date, time, and a classifier representing a status or an impact intensity of the event. The EPV engine includes an event pre-processing module, an event registration module, and an event personalization module. The event pre-processing module is configured to verify one or more characteristics of the data. The event registration module is configured to spatially index the verified data using an R-tree including a plurality of nodes. At least one node among the plurality of nodes corresponds to the selected event type. The at least one node includes a linked list referring to a location in the database for the data. The event personalization module is configured to provide context-aware and personalized access to the data based on the selected event type. The event personalization module includes a membership management module, an event visualization module, and a recommendation module. The membership management module is configured to compute membership level of the user registered in the database based on the data or a predefined ranking of the selected event type. The event visualization module is configured to retrieve the computed membership level of the user, overlay the data on the at least one map based on the selected event type, and display the overlaid map based on the retrieved membership level of the user. The recommendation module is configured to provide context-aware recommendations based on at least one of the data and the selected event type.

Other and further aspects and features of the disclosure will be evident from reading the following detailed description of the embodiments, which are intended to illustrate, not limit, the present disclosure.

BRIEF DESCRIPTION OF THE DRAWINGS

FIGS. 7A and 7B are snapshots of an exemplary display screen of the road event information device of FIG. 1 illustrating a user login screen and selection screen for road event types, respectively, according to an embodiment of the present disclosure.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Exemplary Embodiments

Figure 1:
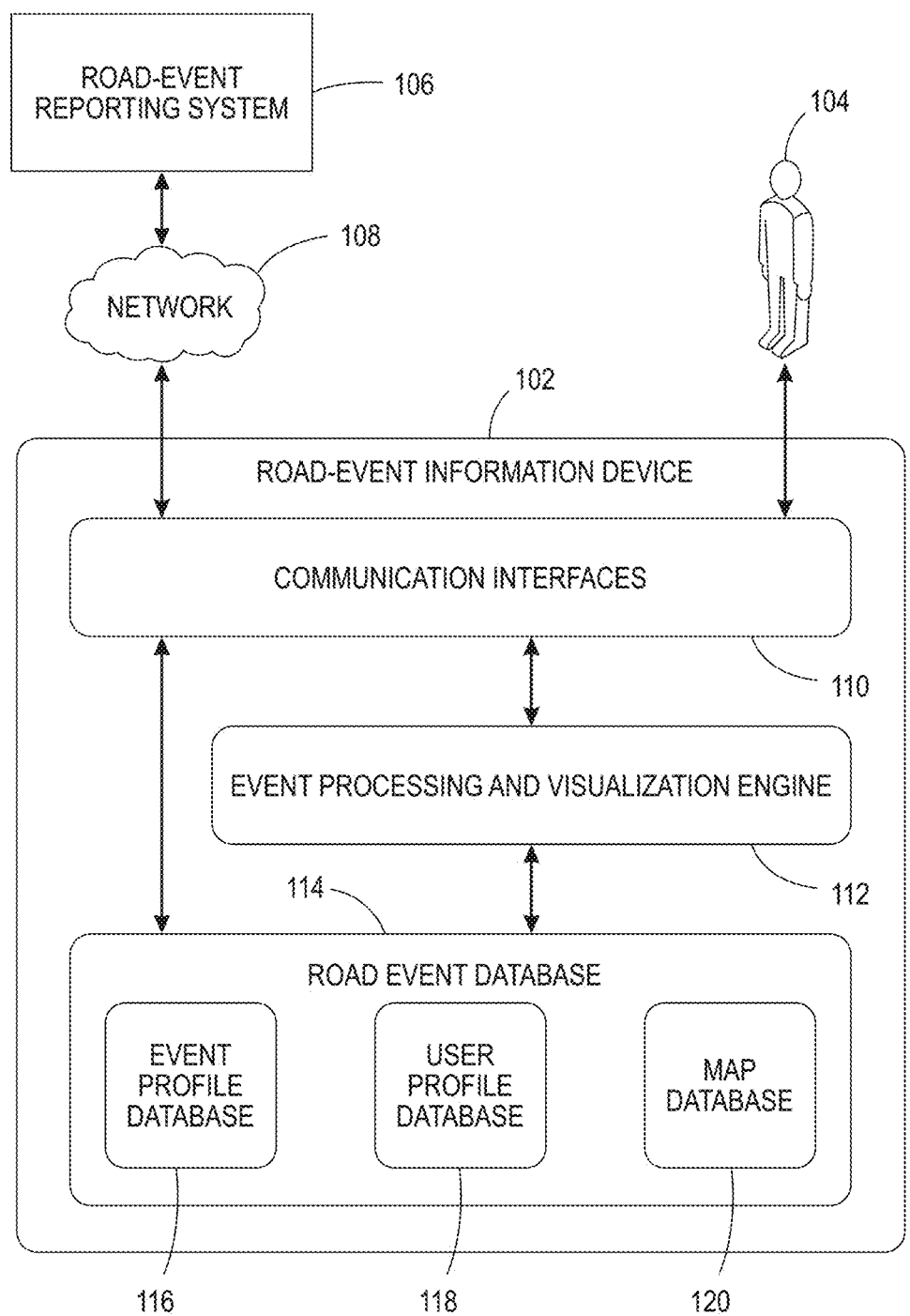
FIG. 1 is a schematic that illustrates an exemplary road event information device, according to an embodiment of the present disclosure.

FIG. 1 is a schematic that illustrates an exemplary road event information device, according to an embodiment of the present disclosure. Some embodiments are disclosed in the context of road events between a pair of predetermined locations to provide augmented trip planning and a safe driving experience. However, other embodiments may be applied to various scenarios for collection and retrieval of context-aware and personalized data. Examples of these scenarios may relate to operational status of local medical centers, geographical distribution of residential and commercial realty, animal spotting zones, violence-prone areas, geographical distribution of polling stations, etc.

Embodiments may include a road event information device (RID) 102 configured to receive road event reports including multimodal data, e.g., image data, audio data, video data, biometric data, textual data, etc., pertaining to the road events. Examples of these road events include, but are not limited to, potholes, speed bumps, dysfunctional street lighting, construction work, road maintenance work, crowd protests, road accidents, water-logging, foggy conditions, rainfall, and snowfall. Further, the road event reports may include the multimodal data (i.e., road event data) related to multiple predefined parameters such as location, date, time, and a classifier for the road event. The classifier may represent a status or impact intensity of the road event.

The road event reports may be received from a requestor who is registered with the RID 102 as a member. The requestor may interact with the RID 102 based on unique login credentials. Examples of the requestor may include users such as a user 104, who may be a resident of a particular geographical location, and a road-event reporting system 106. In some embodiments, the road-event reporting system 106 may operate based on inputs received from the user 104.

The road-event reporting system 106 may include one or more known, related art, or later developed computing devices and compatible software packages, each configured to detect, capture, analyze, and communicate the road event report for use by the RID 102. In one instance, the road-event reporting system 106 may include a variety of sensors (not shown) such as accelerometers, cameras, gyroscopes, microphones, magnetometers, barometers, etc. to sense the road events, e.g., on a given vehicle route. The sensors may be dynamically operated by a sensor controller (not shown) within a given sampling period. In another instance, or additionally, the road-event reporting system 106 may include a data pre-processing engine (not shown), which may perform various operations to locally analyze the sensed road event data. Examples of these operations include, but are not limited to, (1) inferring a classification type (e.g., potholes, speed bumps, crowd protests, water logging, etc.) of the sensed road event data based on various known, related art, or later developed machine learning algorithms; (2) determining quality of the sensed road event data with respect to a predefined threshold, which when exceeded the road-event reporting system 106 may recapture or prompt to enter new samples for the sensed road event data; and (3) removing irrelevant or sensitive data, such as personal information of the user 104, from the sensed road event data, thereby preserving user privacy as well as reducing the cost of communicating the road event data to the RID 102. Based on such analysis of the sensed road event data, the road-event reporting system 106 may communicate a corresponding road event report to the RID 102. In some embodiments, the road-event reporting system 106 may be integrated with the RID 102.

RID 102 may be implemented as any of a variety of known, related art, or later developed computing devices configured to at least one of (1) store, manage, and process the multimodal road event data, (2) establish a communication channel or environment, and (3) request services from or deliver services to, or both, other devices connected to a network 108. Examples of the computing devices include a desktop PC, a personal digital assistant (PDA), a server, a mainframe computer, a mobile computing device (e.g., mobile phones, laptops, tablets, etc.), an internet appliance, etc.

Some of the disclosed embodiments may include or otherwise involve data, such as the road event data, transfer between the road-event reporting system 106 and the RID 102 over the network 108. The network 108 may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network 108 may include multiple networks or sub-networks, each of which may include, for example, a wired or wireless data pathway. The network 108 may include a circuit-switched voice network, a packet-switched data network, or any other network that is able to carry electronic communications. For example, the network 108 may include networks based on the Internet protocol (IP) or asynchronous transfer mode (ATM), and may support voice using, for example, VoIP, Voice-over-ATM, or other comparable protocols used for voice data communications. In some embodiments, the network 108 may include a cellular telephone network configured to enable exchange of text or SMS messages.

The RID 102 may include communication interfaces 110, an event processing and visualization engine (EPV engine) 112, and a road event database 114. The communication interfaces 110 may coordinate interactions between the road-event reporting system 106, or the user 104, and the EPV engine 112. The communication interfaces 110 may be any of a variety of known, related art, or later developed interfaces including software interfaces (e.g., an application programming interface, a graphical user interface, etc.), hardware interfaces (e.g., cable connectors, a keyboard, a card reader, a biometric scanner, a microphone, a camera, an interactive display screen, etc.), or both. In some embodiments, the communication interfaces 110 may include a module (not shown) configured to perform opportunistic communication between the road-event reporting system 106, or the user 104, and the RID 102. Such opportunistic communication may allow the exchange of road event data between the RID 102 and various networked-devices whenever high speed network connection is available, thereby reducing the data transmission cost over the network connection.

Further, the communication interfaces 110 manage interactions between the road-event reporting system 106, or the user 104, with the road event database 114, as well as between the road-event reporting system 106, or the user 104, with the EPV engine 112. These interactions may include instructions, queries, data, etc. In some embodiments, the communication interfaces 110 may be configured to convert these interactions from the road-event reporting system 106, or the user 104, into appropriate formats to make them compatible with the EPV engine 112 and the road event database 114, and vice versa. Consequently, the communication interfaces 110 may allow implementation of the road event database 114 using different technologies or by different organizations, e.g., a third-party vendor, managing the road event database 114 using a proprietary technology.

In one embodiment, the EPV engine 112 may be configured to perform various operations such as to (1) verify various characteristics, e.g., authenticity, duplicity, completeness, etc., of the received road event data, (2) register the road event data in the road event database 110 using a spatial index based on hierarchical data structures, e.g., R-trees, B-trees, etc., discussed later in greater detail, (3) dynamically manipulate and determine membership level of the requestor such as the user 104 based on various factors, e.g., the road event data, number of road event data submissions made to the RID 102, predefined ranking of the type of road event data, and so on, (4) create a visualization of the road events by superimposing the corresponding road event data over a map according to the determined membership level of the user 104, (5) generate context-aware recommendations for various road events based on the road event data or the road event type associated with the road event data, and (6) display the created visualization of the road events in a context-aware and personalized manner based on the road event type selected by the requestor, e.g., the user 104.

The EPV engine 112 may represent any of a wide variety of devices configured to provide context-aware and personalized visualization of the road events based on the type of road events selected from a list of predefined road event types and the membership level of the requestor, such as the user 104. The EPV engine 112 may be implemented as a standalone and dedicated "black box" including hardware and installed software, where the hardware is closely matched to the requirements and/or functionality of the software. Alternatively, the EPV engine 112 may be implemented as a software application or a device driver. The EPV engine 112 may enhance or increase the functionality and/or capacity of the network to which it is connected. The EPV engine 112 may be further configured, for example, to perform e-mail tasks, security tasks, network management tasks including IP address management, and other tasks. In some embodiments, the EPV engine 112 may be configured to expose its computing environment or operating code to the user 104, and may include related art I/O devices, such as a keyboard or display. The EPV engine 112 of some embodiments may, however, include software, firmware or other resources that support remote administration and/or maintenance of the EPV engine 112.

The EPV engine 112 may include at least one processor (not shown) executing machine readable program instructions for performing various operations, such as those discussed above, on the road event data. The EPV engine 112 may include, in whole or in part, a software application working alone or in conjunction with one or more hardware resources. Such software applications may be executed by the processor on different hardware platforms or emulated in a virtual environment. Aspects of the EPV engine 112 may leverage known, related art, or later developed off-the-shelf software. The processor may include, for example, microprocessors, microcomputers, microcontrollers, digital signal processors, central processing units, state machines, logic circuits, and/or any devices that manipulate signals based on operational instructions. Among other capabilities, the processor may be configured to fetch and execute computer readable instructions in the RID memory.

In some embodiments, the RID 102 may be preconfigured or dynamically configured to include the EPV engine 112, which may be integrated with other devices. For example, the EPV engine 112 may be integrated with an internet appliance or any other device (not shown) connected to the network 108. The RID 102 may include a module (not shown), which enables the RID 102 being introduced to the network appliance, thereby enabling the RID 102 to invoke the EPV engine 112 as a service. Examples of the network appliance include, but are not limited to, a DSL modem, a wireless access point, a router, a base station, and a gateway.

The EPV engine 112 may operate in communication with the road event database 114. The road event database 114 may be in communication with or sub-divided into multiple databases including, but not limited to, an event profile database 116, a user profile database 118, and a map database 120. The event profile database 116 may store the road event data related to multiple predefined parameters such as date, time, dimensions, a location, the classifier representing the impact intensity or status of a road event, event description, name of inputter submitting the event data, user comments, and multimedia data such as image data, audio data, video data, biometric data, or any combination thereof, and so on.

The user profile database 118 may store membership data of the requestor such as the user 104 registered with the RID 102. Examples of the membership data include, but are not limited to, requestor's name, age, address, current location, a membership level, and the selected event road event types. The membership level may range between a pair of predefined values. In one embodiment, the membership data may control exposure to the visualizations of road events created by the EPV engine 112. In one example, the membership level may range from '0' to '4', where level 0 may refer to the lowest level of user membership providing minimum exposure to the visualizations and level 4 may refer to the highest level of user membership providing maximum exposure to the visualizations from a location, e.g., the current location) of the user 104.

The map database 120 may store different types of maps, which may be two-dimensional, three-dimensional, or interactive in nature. Examples of these maps include, but are not limited to, a street map, a topographic map, a climate map, and a thematic map. These maps may be imported from various sources such as public databases (e.g., Google Maps), private databases (e.g., government regional map databases), and user-customized maps received directly via the communication interfaces 110.

The road event database 114 including the event profile database 116, the user profile database 118, and the map database 120 may have one of many database schemas known in the art, related art, or developed later for context-aware and personalized access to the road event data stored in the road event database 114. In one embodiment, the event profile database 116 may be implemented as a spatial database for the road event data being processed as geometric objects such as points, lines, and polygons using a spatial index including nodes. Each of the nodes may represent a road event type corresponding to a road event such as a pothole, a speed bump, etc. In one embodiment, the nodes may be augmented using linked lists, which point to child nodes or locations in the event profile database 116 where the road event data may be stored or is being stored. Such spatial index is discussed later in greater detail. In some embodiments, the user profile database 118 and the map database 120 may also be implemented as spatial databases using the spatial index augmented with linked lists.

Other embodiments may include the road event database 114 being additionally implemented using any other known, related art, or later developed database schema. For example, in addition to the spatial database schema, the road event database 114 may be implemented with a relational database schema involving at least one primary key attribute including one or more secondary attributes in each of the included databases. For example, the user profile database 118 may have a primary key attribute 'User Id' with secondary attributes 'name', 'location, and 'age'. Each primary key attribute of one database may be related to one or more primary key attributes of another database. For example, a primary key attribute 'Submitter ID' in the event profile database 116 may be related to a primary key attribute 'User ID' in the user profile database 118. The primary key attributes may be same or different for the sub-databases such as the event profile database 116, the user profile database 118, and the map database 120.

Figure 2:
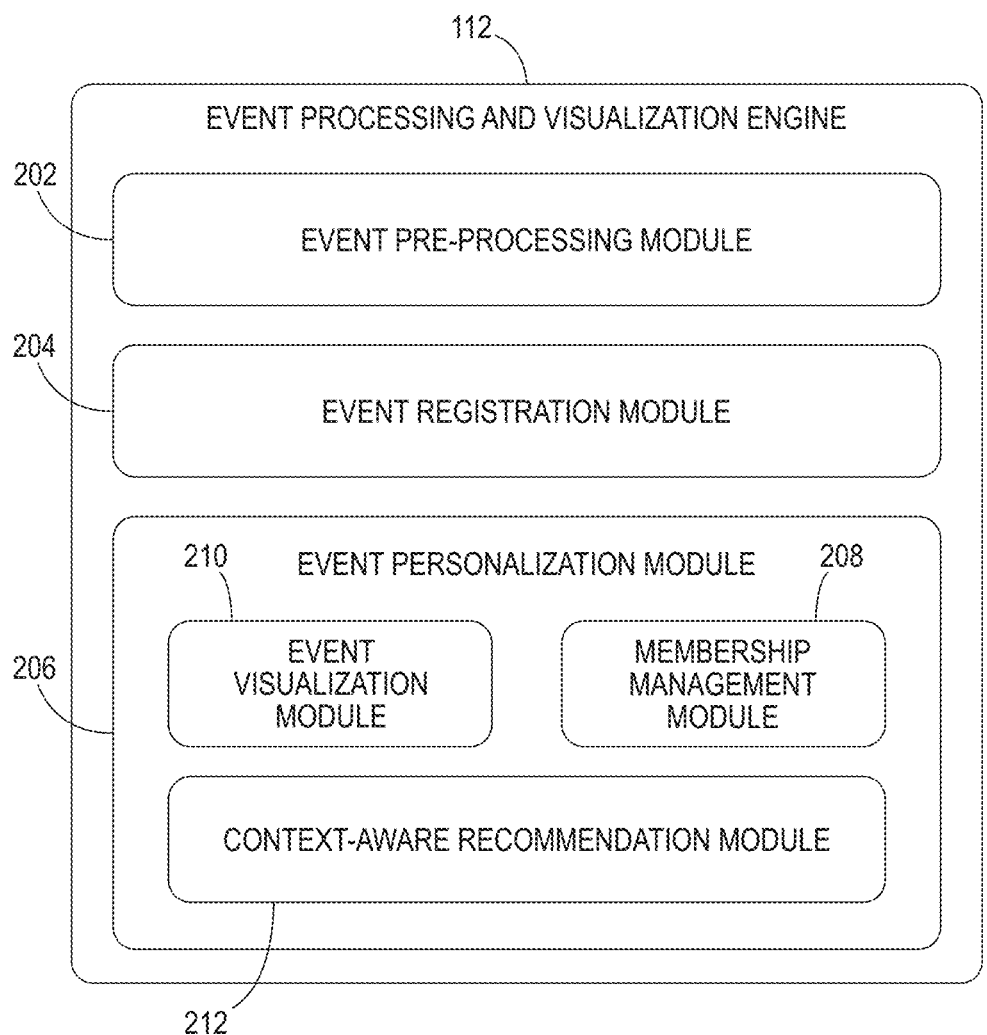
FIG. 2 is a schematic that illustrates an exemplary event processing and visualization engine (EPV engine) included in the road event information device of FIG. 1, according to an embodiment of the present disclosure.

FIG. 2 is a schematic that illustrates the exemplary EPV engine 112 included in the RID 102 of FIG. 1, according to an embodiment of the present disclosure. The EPV engine 112 may include an event pre-processing module 202, an event registration module 204, and an event personalization module 206. The event pre-processing module 202 may be configured to verify various characteristics of the road event data. In one example, the event pre-processing module 202 may verify completeness of the received road event reports based on the road event data received for a minimum set of predefined parameters for each road event type. For example, a road event type pertaining to a road event 'pothole' may require at least location data and temporal data (i.e., date and time of occurrence) for the corresponding road event report to be considered as complete. However, another road event type pertaining to a road event 'fire incident' may require at least the classifier data along with the location data and the temporal data for the corresponding road event report to be considered as complete. When the road event data for a preconfigured minimum set of predefined parameters is missing, the event pre-processing module 202 may either delete the incomplete reports or prompt, e.g., the user 104, to enter the road event data required to make a road event report as complete.

Some embodiments may include the event pre-processing module 202 being further configured to verify duplicity of the received road event reports, or the corresponding road event data. For example, the event pre-processing module 202 may communicate with a global positioning system (GPS) module (not shown), which may be located in the road-event reporting system 106 or the RID 102. The GPS module may automatically associate location data (hereinafter referred to as GPS data) with the road event report wherever the corresponding road event is recorded. The GPS data may include at least latitude and longitude data of the GPS module, and hence that of the road event. In some embodiments, the location data received from the user 104.

The event pre-processing module 202 may compare the location data associated with multiple received road event reports for the same road event type. In one instance, if the location data associated with a received road event report is same as that associated with another already stored road event report, then the received road event report, or the corresponding road event data, may be duplicate. Upon detecting a duplicate road event report based on the location data, the event pre-processing module 202 may be configured to (1) prompt, e.g., the user 104, for analysis and accordingly confirm submission of the road event report to the RID 102, or (2) verify authenticity of the received road event report, or the corresponding road event data.

Other embodiments may also include the event pre-processing module 202 configured to verify authenticity of the received road event data. For example, the event pre-processing module 202 may receive a first road event report associated with a first classifier, such as 'ongoing', about a pothole at a particular location. However, a second road event report may be associated with a second classifier, such as 'repaired' for the same road event 'pothole' and in the same location. In such cases of conflicting road event reports being received for the same road event, the event pre-processing module 202 may compare (1) the number of occurrences of the first road event report, or the corresponding road event data, associated with the first classifier, and (2) the number of occurrences of the second road event report, or the corresponding road event data, associated with the second classifier about the same road event, with a threshold value. If the number of occurrences of the first road event report exceeds the threshold value, then the event pre-processing module 202 may determine that the road event is 'ongoing' so as to increment the frequency of occurrence of the road event 'pothole' in the event profile database 116. Else, the event pre-processing module 202 may decrement the frequency of occurrence of the road event 'pothole' in the event profile database 116 when the number of occurrences of the second road event report is greater than the threshold value, since the second classifier indicates that the road event 'pothole' is 'repaired'. In some embodiments, when the number of occurrences of both the first road event report and the second event report are same, then the event pre-processing module 202 may be configured to keep the value of frequency of occurrence of the road event 'pothole' unchanged. Basis the above described verification of the road event reports or the corresponding road event data, the event pre-processing module 202 may communicate the complete, unique, and authentic road event reports, or the corresponding road event data, to the event registration module 204 for indexing. Some embodiments may include the event pre-processing module 202 being preconfigured or dynamically configured to verify the authenticity of road event data based on a predefined threshold value or a range of threshold values associated with predefined classifiers for each road event or a corresponding road event type.

Figure 3:
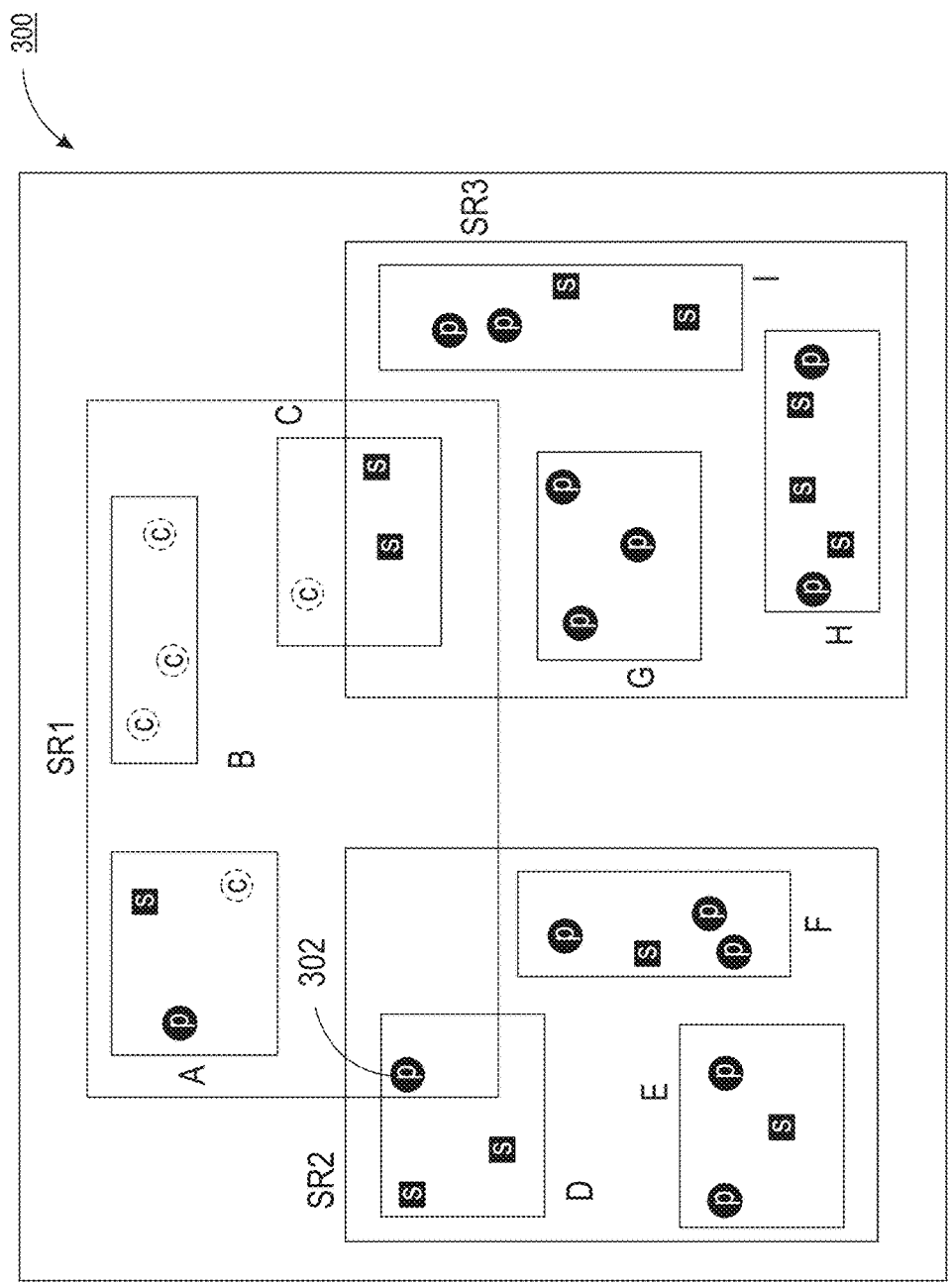
FIG. 3 is a schematic that illustrates exemplary distribution of road event types in space for use by the road event information device of FIG. 1, according to an embodiment of the present disclosure.

The event registration module 204 may be configured to spatially index various road event types and the corresponding road event data associated with the road event reports received from the event pre-processing module 202. In one embodiment, the event registration module 204 may create a spatial index using a hierarchical data structure for indexing the road event types in the event profile database 116. In one example, the hierarchical data structure may include a modified R-tree (hereinafter referred to as ψR-tree), which is augmented with linked lists. Such a ψR-tree-based spatial index may link the road event type to a location where the corresponding road event data is stored, or may be stored, in the road event database 114. For this, the road event types may be distributed in a geometric space where the road event types may be represented as geometric objects as shown in FIG. 3. In the shown example, the geometric space 300 may include multiple road event types extracted from the received road event reports. The geometric space 300 may be divided into three rectangular spatial regions {SR1, SR2, SR3}. Each of these regions SR1, SR2 and SR3 may be further divided into the spatial regions {A, B, C}, {D, E, F} and {G, H, I}, respectively, to include one or more road event types. For the sake of simplicity, FIG. 3 has been shown to include only three road event types, namely, (1) 'p' representing the road event 'pothole', which is shown by solid circles, (2) 's' representing the road event 'dysfunctional street light', which is represented by solid squares, and (3) 'c' representing the road event 'construction work', which is shown by dotted circles.

The rectangular spatial regions {SR1, SR2, SR3}, {A, B, C}, {D, E, F} and {G, H, I} may be referred to as minimum bounding rectangles (MBRs) including one or more road event types based on different predefined criteria. According to one exemplary criterion, one or more road event types may be included within a particular MBR so that the MBR occupies minimum total volume. According to another exemplary criterion, the MBR may include the road event types so as to have minimum or no overlap with other MBRs. Further, the MBRs may overlap with each other due to common attributes, or corresponding attribute values, for different road event types. Examples of these attributes may include, but not limited to, time, name of the inputter submitting a corresponding road event data, and road event type. For instance, SR1 and SR2 may represent different geographical locations. If the road events corresponding to all the road event types in the MBRs {A, B, C} occur at relatively the same time when the road event 'pothole' corresponding to the event type 302 occurred in the MBR {D}, then SR1 and SR2 may overlap with each other.

Embodiments of the ψR-tree spatial index may be implemented to include a predefined number of road event types in each MBR using various known, related art, or later developed algorithms such as linear split, quadratic split, and exponential split algorithms based on the predefined criteria such as those discussed above. In some embodiments, the MBRs may be dynamically created based on a query or request received to access the road event data associated with one or more road event types. One exemplary structure for the ψR-tree spatial index corresponding to the distribution of road event types in the geometric space 300 is shown in FIG. 4.

Figure 4:
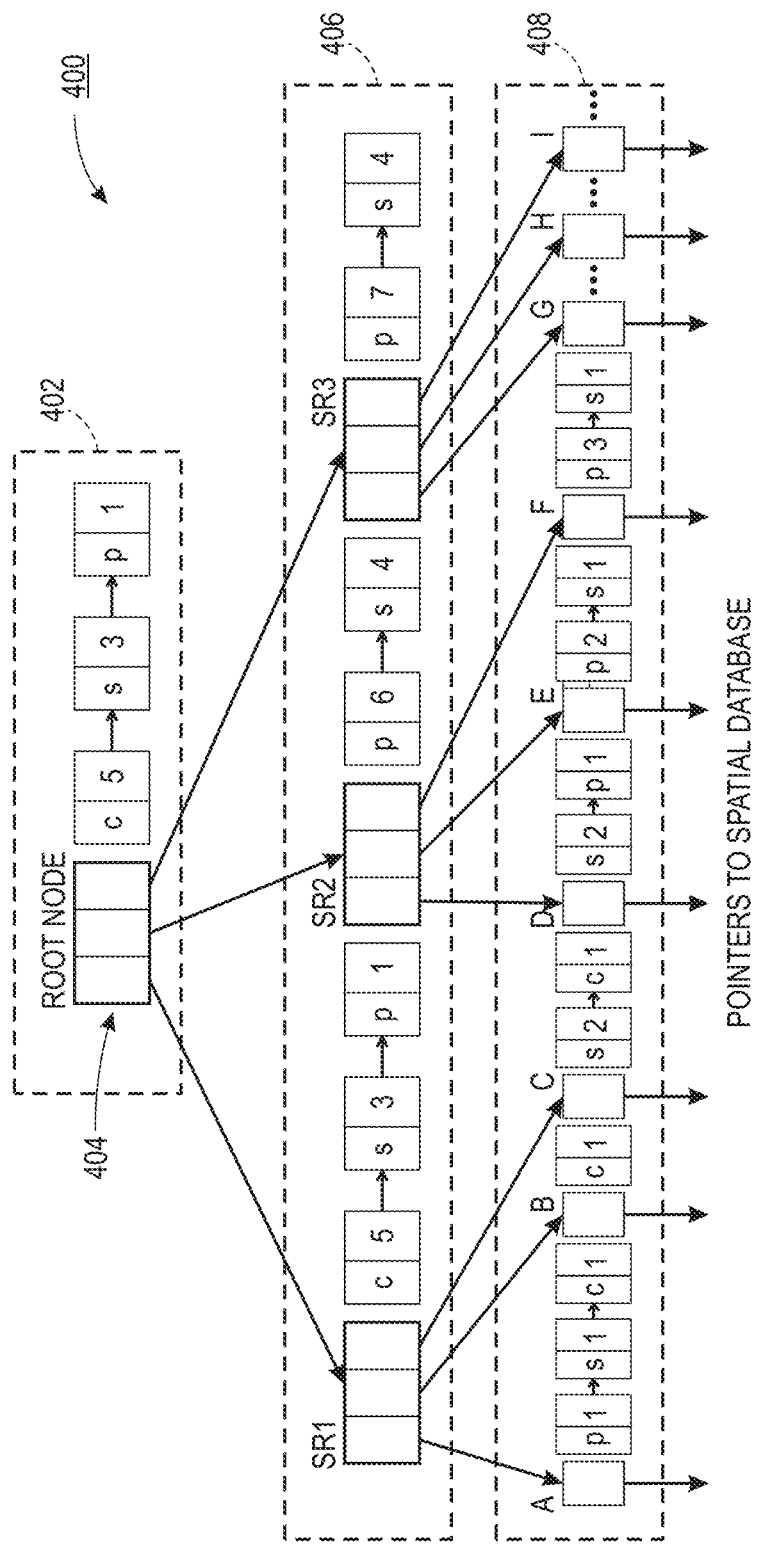
FIG. 4 is an exemplary ψR-tree spatial index based on the distribution of road event types in FIG. 3, according to an embodiment of the present disclosure.

As shown in FIG. 4, the ψR-tree spatial index may include the modified R-tree, e.g., a ψR-tree 400 including a multiple nodes, each representing a road event type. As depicted, 'p', and represent the road event types, corresponding to the road events, namely, potholes, dysfunctional street lights, and construction work, respectively. The ψR-tree 400 includes a root node 402 representing a linked list including one or more road event types, their corresponding total frequency of occurrences, and pointers 404. In the shown example, the linked list entries of the root node 402 indicate that the regions covered by the geometric space 300 include that the road event 'potholes' has the total frequency of occurrence as 14, the road event 'dysfunctional street lights' has the total frequency of occurrence as 12, and instances of the road event 'construction work' has the total frequency of occurrence as 5. The root node linked list refers to different nodes of the ψR-tree using the pointers 404.

As shown, the pointers 404 of the root node 402 may point to non-leaf nodes 406 of the ψR-tree 400 representing the spatial regions {SR1, SR2, SR3}. The non-leaf nodes 406 may be represented in the form (ptr, mbr, LL), where (1) 'ptr' is a pointer to one or more child nodes, e.g., leaf nodes, in the $\psi_R$-tree 400; (2) 'mbr' is the MBR (Minimum Bounding Rectangle), which covers all the MBRs in those child nodes; and (3) 'LL' is a linked list structure, each node of which includes entries of the form (event$_{tag}$, num$_{instances}$), where 'event$_{tag}$' may represent the type of road event corresponding to different road events such as potholes, public processions, dysfunctional street lights and so on. The 'num$_{instances}$' may refer to the frequency of occurrence of a given road event type within a specific MBR. For example, as shown, the non-leaf node SR1 includes the LL nodes having a road event type 'p' with a value 1, a road event type 's' with a value 3, and a road event type 'c' with a value 5, where each of the values represent the frequency of occurrence of the corresponding road event type. Further, these LL nodes may be sorted in descending order of the frequency of occurrence of the road event types to address an increase in the number of queries pertaining to a specific type of road event, if that road event type occurs more often within an MBR of a given region. For example, if the MBR of a region includes a significantly high number of potholes and speed bumps, then the requestor, such as the user 104, may more likely issue personalized queries to retrieve information about the road events pertaining only to these two road event types. Thus, the computation cost of traversing the sorted LL nodes may reduce for the 'popular' user queries.

For each type of road event, quantification of the frequency of occurrence may be pre-defined based on the application. In one example, the frequency of occurrence of a road event 'construction work' may be quantified by measuring the number of different construction works that are currently on-going in a given area. In another example, the frequency of occurrence may be computed based on a predefined weighted average function of the relative sizes of each of these construction areas. Similarly in yet another example, the frequency of occurrence for a road event 'water-logging' may be computed based on the size of the water-logged area.

Further, the spatial regions {A, B, C}, {D, E, F} and {G, H, I} may be represented as leaf nodes 408 of the ψR-tree 400. Unlike the existing R-tree-based index structures, in one embodiment, the leaf nodes 408 may include entries of the form (SR$_{ID}$, loc, LL$_L$), where SR$_{ID}$ may be a pointer to a specific spatial region (SR) or position in the spatial database, e.g., the event profile database 116, which may be indexed as a ψR-tree structure, entity-relationship schema, or any other schema known in the art, related art, or later developed. Here, 'loc' may refer to the location, e.g., a disk page, of this SR in the road event database 114. Thus, 'loc' may be specified either by one set of (x,y) coordinates if the SR is represented as a geometric object such as a point in the granularity of the geometric space 300 being considered, or two sets of (x,y) coordinates if the SR is represented as a rectangle in that space 300. Furthermore, 'LL$_L$' is a linked list, whose structure is essentially the same as that of the structure of the linked lists that are associated with the non-leaf nodes 406 of the ψR-tree 400.

In contrast to the non-leaf node levels of the ψR-tree 400 where the linked lists include the road event types (which occur within the MBR of the region covering the respective non-leaf node 406) and the respective frequencies of occurrence of each of these road event types, the linked lists (which include regions covered by the respective MBRs) at the leaf node-level may refer to detailed information corresponding to the road event data for the road events that may be retrieved by means of the pointer SR$_{ID}$ to the spatial region SR in the spatial database, e.g., the event profile database 116, where such detailed information may typically be stored. For example, various parameters pertaining to the average breadths and depths of the potholes or the average heights of speed bumps may be accessed from the spatial database. Thus, the ψR-tree 400 includes the road event data corresponding to the road events at finer granularity for the spatial regions that are covered by the MBRs at the leaf-node levels than those at the non-leaf node levels by using the linked list LL$_L$.

The ψR-tree 400 may be created to include the linked lists based on known, related art, or later developed insertion algorithms. In one instance, insertion of a new road event type may require a top-down traversal of the ψR-tree 400. At each level of the ψR-tree 400 and for each MBR (shown in FIG. 3) which intersects or overlaps with the spatial window or coverage region of the road event type, if a given road event type is not present in a given linked list, the event registration module 204 may add the given road event type as a new node to the linked list at an appropriate position to keep the linked list sorted based on the corresponding frequency of occurrence of each road event type. When the given road event type is already present in a given linked list, the frequency of occurrence is simply incremented by the number of event instances of that road event type. For example, if the road event type corresponding to the road event 'pothole' already exists in a given linked list, and a new road event report feeds five more occurrences of the same road event type for the road event 'pothole', the frequency of occurrence for this road event type may be incremented by five.

Similarly, the road event types in the ψR-tree 400 may be subtracted from the frequencies of occurrences stored at the respective linked list entries based on (1) the one or more parameters, such as the classifier, associated with the road event report or the corresponding road event data, or (2) the number of deleted event instances for the road event types. For example, if the received road event report indicates that a specific number of potholes have been repaired in a given region, the frequency of occurrence for the corresponding linked list entries of the road event type 'pothole' may be decremented accordingly. Further, if the frequency of occurrence for a given node representing a road event type becomes zero as a result of the decrement based on the received road event reports, that node may be deleted from the linked list of the road event type.

The ψR-tree 400 by using the linked lists at both the non-leaf nodes 406 and the leaf nodes 408 provides the users with the flexibility to access both fine-grained as well as coarse-grained information about road events depending upon the selected road event types, e.g., by the user 104. Queries for accessing coarse-grained information about road events (e.g., the number of speed bumps in a given area) entail significantly lower data access costs because such queries can be answered directly via the ψR-tree spatial index without necessitating the need to perform costly spatial database accesses. However, accessing the fine-grained information about road events (e.g., average height of speed bumps in a given region) may require access to the spatial database, which involves data access costs relatively greater than that for accessing the coarse-grained information.

Unlike the existing data indexing schemas, the ψR-tree-based indexing structure (1) augments nodes of the ψR-tree with linked lists that associates various road event types with different spatial regions (e.g., the event profile database 116) or locations (e.g., a disk page in the road event database 114) in the geometric space; (2) keeps the linked list at each node of the ψR-tree sorted in the descending order of importance to enable quick retrieval of the types of road events that are more prevalent in a given region; and (3) facilitates personalized retrieval of data concerning road events based on, e.g., user-selected road event types. This ψR-tree approach indexes multiple road events, or corresponding road event types, in a single R-tree structure using the linked list augmentation at each R-tree node and hence, requires traversal of only one R-tree-based index, e.g., the ψR-tree 400, instead of multiple R-trees to facilitate responding in real time to a data access query involving multiple road event types.

Moreover, the event registration module 204 verifies if the road event reported in a received road event report has also been reported previously or by another user. If the received road event report is the first road event report concerning a given road event, the event registration module 204 may create a new event entry in the event profile database 116. Otherwise, the event registration module 204 may search for the previous event report entries (e.g., road event types and corresponding data), which are already in the event profile database 116, and then may merge the currently received road event report data with them.

The event personalization module 206 may be configured to provide context-aware and personalized information about the road events based on the road event types received with a query, e.g., from the user 104, where the road event types may be selected from a predefined list of road event types. The event personalization module 206 may include a membership management module 208, an event visualization module 210, and a context-aware recommendation module 212.

The membership management module 208 may be configured to access the membership data in the user profile database 118 for computing the membership level of a user such as the user 104 associated with the received road event report, or the corresponding road event data. The membership management module 208 may dynamically compute differentiated membership level for the user 104 based on several factors such as a predefined ranking of the road event type and the received road event data for different predefined parameters such as location, time, etc. The computed membership level may be associated with the membership data of the user 104 associated with the received road event report.

Figure 5:
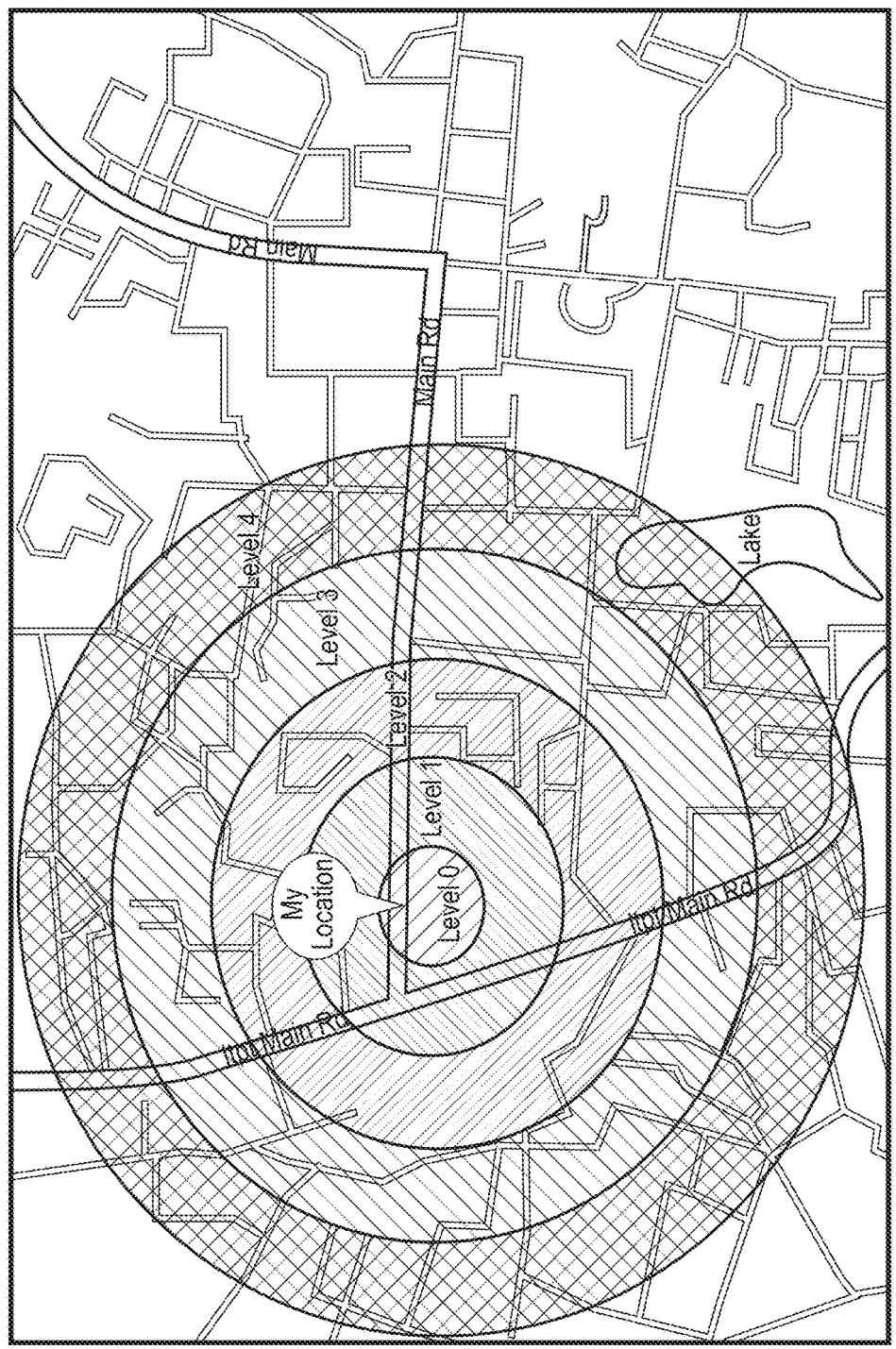
FIG. 5 is a schematic that illustrates exemplary variation in spatial vision window size with respect to a user's membership with the road event information device of FIG. 1, according to an embodiment of the present disclosure.

In one embodiment, the computed membership level may be used to manage multiple discrete levels of access to fine-grained information, such as reported events, popular queries, recommendations about the road events, etc., in a relative geographical region defined as a spatial vision window around the user's current location. For example, a given user's spatial vision window may expand with increase in his membership level for encouraging the user 104 to proactively participate in sharing information (e.g., the road events such as potholes, speed bumps, etc.,) with the RID 102 to attain a higher level of membership. Exemplary variations in the spatial vision window with respect to different levels of membership are shown in FIG. 5. As shown, the membership level may increase from level '0' to level '4'. Here, level 0 may refer to the lowest level of user membership, while level 4 may refer to the highest level of user membership. Hence, as shown, the user 104 with the level 0 membership may have a relatively smaller spatial vision window as compared to that of another user 104 with a level 4 membership from the user's current location represented as 'My Location'.

The spatial vision window of the user 104 may expand as the user 104 attains a higher level of membership, thereby providing the user 104 with access to information at further distances from her current location. Such spatial vision may assist the user 104 to more effectively make trip planning decisions based on the spatial vision window to see farther down the potential routes that the user 104 may prefer to adopt in view of various road events. For example, a first user with a larger spatial vision window may retrieve a road event report, or the corresponding road event data, which may state that a tree has just fallen on the road 10 km from her current location, thereby blocking one of her possible routes. However, such information may not be available to a second user with a smaller spatial vision window of 2 km, for example. Such mapping of the spatial vision window sizes with respect to the different levels of membership may be predefined in the membership management module 208 in association with various agencies such as city planning departments. For example, the city planning departments may decide on the spatial window sizes for each membership level based on different factors such as the spatial population density of a given region, the relative importance of the region, etc., using which the membership management module 208 may be configured or updated.

Further, the event visualization module 210 may be configured to perform a spatial overlay of the road event data extracted from the received road event reports on different maps such as street maps, topographic maps, thematic maps, etc. In some embodiments, the event visualization module 210 may retrieve the processed road event data from the event profile database 116 and overlay the retrieved data as different layers on various types of maps such as 2-D maps, 3-D maps, interactive maps, etc. These maps with newly generated layers of different road event types and the corresponding retrieved road event data may be used to provide maps in a personalized manner based on the selected road event types in the received query. In some embodiments, the selected road event types and the overlaid maps may be stored in the user profile database 118 for later access by the corresponding user. The overlaid maps may be also updated continually or at regular intervals in the road event database 114 both in small temporal durations as well as on the arrival of newer road events based on new event reports being received via the communication interfaces 110, thereby in effect enabling a pseudo-real-time visualization of the road events.

On the other hand, the context-aware recommendation module 212 may be configured to generate recommendations based on the road event data and the selected road event types over a period of time. The context-aware recommendation module 212 may provide these recommendations as context-aware services, e.g., in terms of location, and personalized services to the user. In one example, the context-aware recommendation module 212 may be configured to capture user's travel and stay pattern in a particular location. Additionally, it may also consider user preferences using on-demand filters, such as pertaining to the road event types, and profile-matched filters, e.g., pertaining to frequent traveling routes. Thus, based on the user's recognized contextual patterns (e.g., location, time, profile preferences, etc.), the context-aware recommendation module 212 may generate context-aware recommendations for the requestor. The context-aware recommendation module 212 may also provide questions that may be answered by the user, such as the user 104, and the answers received from other users for that question such that the answers are of relevance to the user based on his recognized contextual patterns. Examples of such context-aware recommendations include, but are not limited to, "Road conditions are poor with several potholes in Parkwood Avenue", "There are many speed bumps in the sports street", and so on.

Figure 6A:
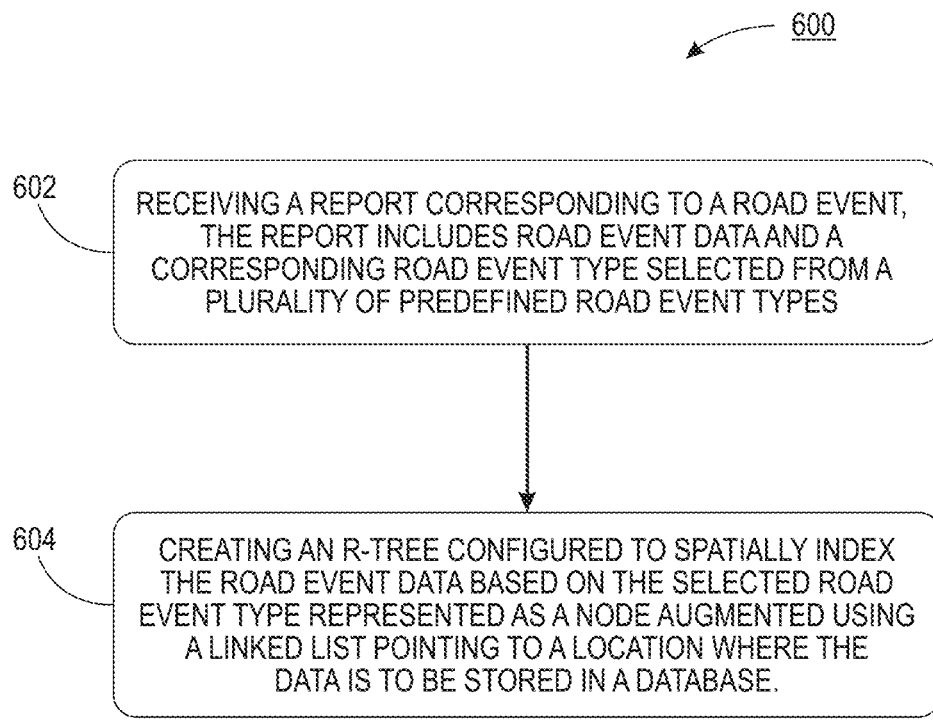
FIG. 6A is a flowchart that illustrates an exemplary method for storing road event data in the road event information device of FIG. 1 to facilitate context-aware and personalized access to the stored data, according to an embodiment of the present disclosure.

FIG. 6A is a flowchart that illustrates an exemplary method for storing road event data in the road event information device of FIG. 1 to facilitate context-aware and personalized access to the stored data, according to an embodiment of the present disclosure. The exemplary method 600 may be described in the general context of computer executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution.

The order in which the method 600 is described is not intended to be construed as a limitation, and any number of the described method blocks may be combined or otherwise performed in any order to implement the method 600, or an alternate method. Additionally, individual blocks may be deleted from the method without departing from the spirit and scope of the present disclosure described herein. Furthermore, the method 600 may be implemented in any suitable hardware, software, firmware, or combination thereof, that exists in the related art or that is later developed.

The method 600 describes, without limitation, implementation of the exemplary road-event information device 102. One of skill in the art will understand that the method 600 may be modified appropriately for implementation in a various manners without departing from the scope and spirit of the disclosure.

Figures 7A, 7B:
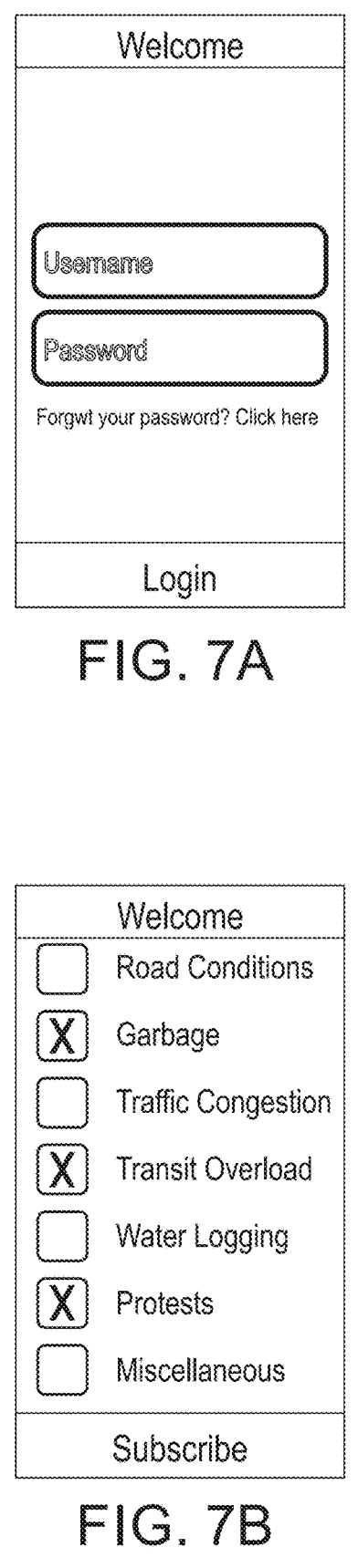

At step 602, a report corresponding to a road event is received. The report includes road event data and a road event type selected from a plurality of predefined road event types. In one embodiment, a requestor, e.g., the user 104, may register with the RID 102 for submitting the road event data related to different road events such as potholes, speed bumps, foggy conditions, road accidents, dysfunctional street lighting, traffic conditions, and so on. The registration data or membership data of the requestor may be stored in the user profile database 118. The membership data may include unique login credentials (e.g., username and password, fingerprint, voice, etc.), name, address, membership level, etc., of the requestor. Once the requestor is registered, the requestor may access the RID 102 either directly or via any computing device, such as the road-event reporting system 106, for logging into the RID 102. As shown in FIG. 7A, the requestor may login into the RID 102 using the registered login credentials including a username and a password.

In one embodiment, the requestor may interact with the road-event reporting system 106, which may be integrated or in communication with the RID 102, for capturing and communicating the road event reports including the road event data to the RID 102. In some embodiments, the requestor may access multiple devices or systems, which may perform the functionalities of the road-event reporting system 106 for interacting with the RID 102. The road-event reporting system 106 may include a sensor controller, a data pre-processing engine, and multiple sensors such as an accelerometer, a gyroscope, a magnetometer, and a camera for sensing a road event such as a speed bump.

Basis sensing of the speed bump by the accelerometer, the gyroscope, and the magnetometer, the accelerometer data may be inputted to the sensor controller, and the gyroscope data and the magnetometer data may be inputted to the data pre-processing engine. The sensor controller may sample the accelerometer data including acceleration values for X, Y and Z axes at regular time intervals and communicate the sampled acceleration data to the data pre-processing engine. Since the accelerometer data may be biased due to one or more orientations of the accelerometer, the data pre-processing engine may re-orient the sampled accelerometer data using the gyroscope data and the magnetometer data. The data pre-processing engine may further compute feature values from the re-oriented accelerometer data for different time periods. Some of the features may include mean and standard deviation along each of the X, Y, and Z axes with the mean and standard deviation values of amplitude computed from accelerometer data.

The computed feature values along with additional data, such as an image captured by the camera, may collectively form the road event data. In some embodiments, the road-event reporting system 106 may further collect the road event data for a variety of predefined parameters in communication with other sensors and computing devices such as a servers, internet appliances, GPS modules, etc. Examples of these parameters include, but not limited to, date, time, dimensions, location, event description, name of inputter submitting the event data, user comments, and multimedia data such as image data, audio data, video data, biometric data, or any combination thereof, and so on. The road-event reporting system 106 may be configured to communicate the road event data to the event pre-processing module 202 of the RID 102 via the communication interfaces 110.

The event pre-processing module 202 may be configured to receive the road event data and display a predefined list of road event types along with corresponding predefined classifiers for each road event type. Examples of the classifiers include, but are not limited to, 'Good', 'Average', 'Below Average', 'Ongoing', 'Repaired', and so on, which may represent the impact intensity or status of the road event for each road event type. The requestor, such as the user 104, may select a road event type and a corresponding classifier for associating them with the received road event data. The event pre-processing module 202 communicates the road event data including the selected road event type and the classifier to the event registration module 204.

At step 604, a $\psi$R-tree configured to spatially index the road event data based on the selected road event type is created, where the selected event type is represented as a node augmented using a linked list referring to a location in the database where the road event data is to be stored.

In one embodiment, the event registration module 204 may be configured to spatially index the received road event data based on the corresponding selected event type using the hierarchical data structure such as the $\psi$R-tree, which is augmented using linked lists. A spatial index based on the $\psi$R-tree includes multiple nodes, each representing the selected event type. In one example, the $\psi$R-tree may include a root node representing a linked list including the event type, frequency of occurrences of the event type and a corresponding pointer that points to one or more non-leaf nodes and leaf nodes, each of which represent the distribution of the road event type in a given spatial region. Unlike the traditional R-tree index structure, both of the non-leaf nodes and the leaf nodes include the pointer and the linked list represent the event type and the corresponding frequency of occurrence in the respective spatial regions, as discussed above. In contrast to the pointer of the non-leaf nodes, the leaf node pointers point to a location in the event profile database 116 where the road event data is then stored.

Moreover, the event registration module 204 may verify that if the road event data has been received previously based on the road event type. If this is the first road event type concerning a given road event, the event registration module 204 may create a new event entry in the event profile database 116. Otherwise, the event registration module 204 may search for the previous entries of the road event type in the event profile database 116. If the selected road event type is already stored in the road event database 114, the event registration module 204 may merge the received road event data with the already existing road event data for the same road event type in the event profile database 116.

Further, the event registration module 204 may create the $\psi$R-tree to include the linked lists based on known, related art, or later developed insertion algorithms. In one instance, insertion of a new road event type may require a top-down traversal of the $\psi$R-tree. If a given road event type is not present in a given linked list, the event registration module 204 may add the given road event type as a new node to the linked list at the appropriate position to keep the linked list sorted based on the corresponding frequency of occurrence of each road event type. When the given road event type is already present in a given linked list, the frequency of occurrence is simply incremented by the number of event instances of the selected road event type. For example, if the road event type corresponding to the road event 'pothole' already exists in a given linked list, and a new road event data feeds five more occurrences of the same road event 'pothole', the frequency of occurrence for the corresponding road event type would be incremented by five.

Similarly, the number of various road event types in the ψR-tree may be subtracted from the corresponding frequencies of occurrences stored at the respective linked list entries based on (1) the one or more parameters, such as the classifier, in the road event data, or (2) the number of deleted event instances for the selected road event type. For example, if a classifier in the received road event report may indicate that a specific number of potholes have been repaired in a given region, the frequency for the corresponding linked list entries of the event type 'pothole' may be decremented accordingly. Further, if the frequency for a given node representing a road event type becomes zero as a result of the decrement based on the received road event data, then that node may be deleted from the linked list of the road event type. For each type of road event, the quantification of the frequency of occurrence may be predefined based on the application, as discussed above.

Simultaneously, the membership management module 208 may be configured to access the membership data in the user profile database 118 for computing membership level of the user 104 who has submitted the road event data. The membership management module 208 may dynamically compute differentiated membership level for the user 104 based on several factors such as a predefined ranking of the road event type and the received road event data for different predefined parameters such as location, time, etc. The computed membership level may store with the membership data of the user 104 associated with the received road event data.

Figure 6B:
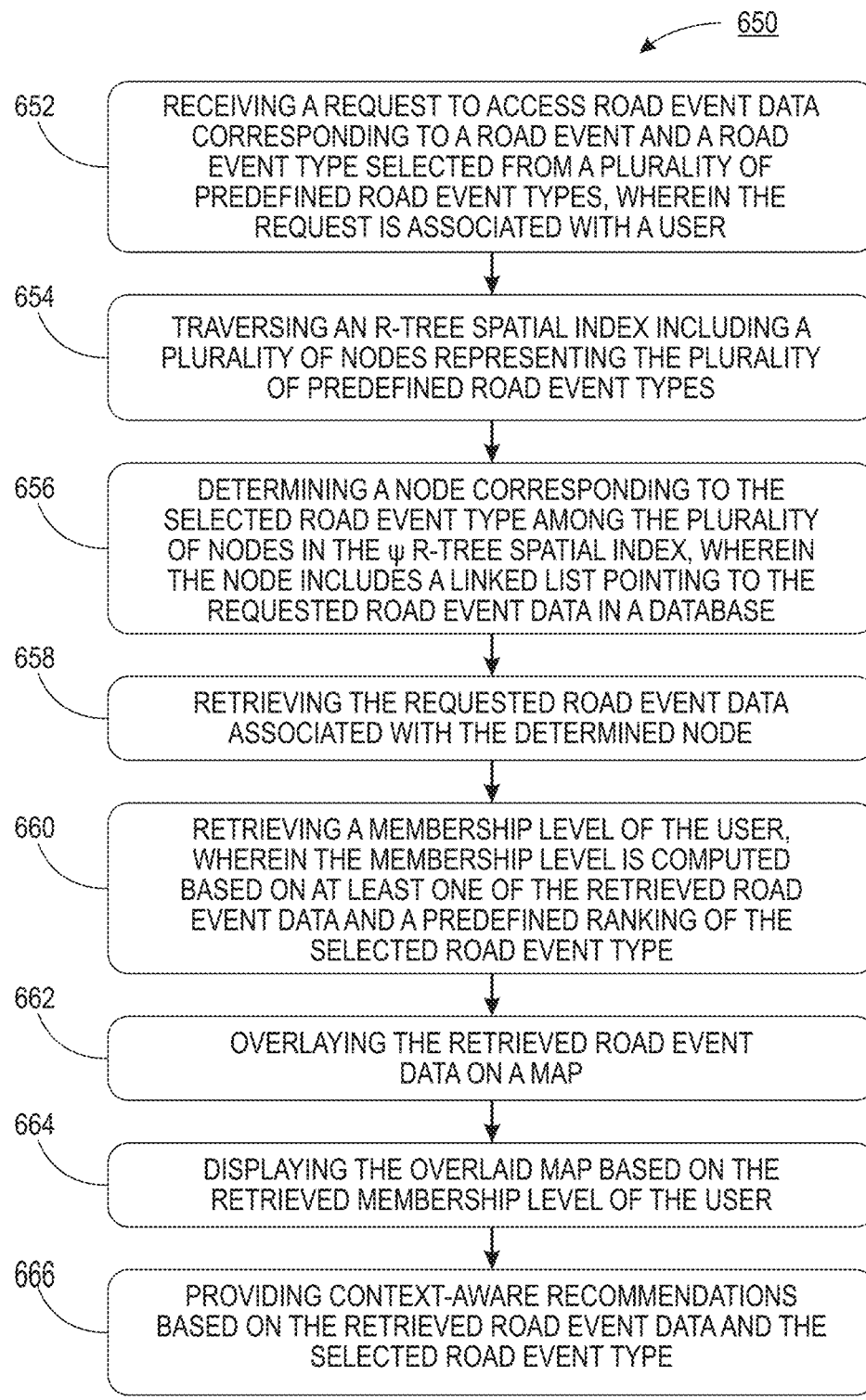
FIG. 6B is a flowchart that illustrates an exemplary method for providing context-aware and personalized access to the road event data stored in the road event information device of FIG. 1, according to an embodiment of the present disclosure.

FIG. 6B is a flowchart that illustrates an exemplary method for providing context-aware and personalized access to the road event data stored in the road event information device of FIG. 1, according to an embodiment of the present disclosure. The exemplary method 650 may be described in the general context of computer executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution.

The order in which the method 650 is described is not intended to be construed as a limitation, and any number of the described method blocks may be combined or otherwise performed in any order to implement the method 650, or an alternate method. Additionally, individual blocks may be deleted from the method without departing from the spirit and scope of the present disclosure described herein. Furthermore, the method 600 may be implemented in any suitable hardware, software, firmware, or combination thereof, that exists in the related art or that is later developed.

The method 650 describes, without limitation, implementation of the exemplary road-event information device 102. One of skill in the art will understand that the method 650 may be modified appropriately for implementation in a various manners without departing from the scope and spirit of the disclosure.

At step 652, a request to access road event data corresponding to a road event and a road event type selected from a plurality of predefined road event types are received. The request is associated with a user. In one embodiment, a requestor such as the user 104 may login into the RID 102 using the login credentials, e.g., a username and a password, recorded in his membership data stored in the user profile database 118 at the time of registration, as shown in FIG. 7A. In some embodiments, the user 104 may login into the RID 102 using other known, related art, or later developed techniques such as those using biometric data (e.g., fingerprint, retina scan, etc.), audio data (e.g., voice), and video data (e.g., face scan, picture scan, etc.) of the user 104. After login, the user 104 may place or select a request to the RID 102 for retrieving the road event data corresponding to a road event such as potholes, speed bumps, etc. along a desired traveling route. Upon selection or placement of the request, the user 104 may be prompted by the event pre-processing module 202 with a predefined list of road event types for the road event. The user 104 may select at least one road event type for which the user 104 wants to retrieve the road event data as shown in FIG. 7B.

At step 654, a ψR-tree spatial index including a plurality of nodes representing the plurality of predefined road event types is traversed. In one embodiment, the event registration module 204 may create a spatial index using a hierarchical data structure, e.g., the ψR-tree. Such ψR-tree-based spatial index may include multiple nodes representing multiple road event types based on the previously received road event reports or the road event data. The ψR-tree-based spatial index associates the road event type to a location in the road event database 114 where the corresponding road event data is present. After selection of the road event type for which the data is to be retrieved, the event visualization module 210 may be invoked to traverse the created ψR-tree beginning at the root node, such as in a top-to-bottom fashion, till the leaf nodes of the ψR-tree.

At step 656, a node corresponding to the selected road event type among the plurality of nodes in the R-tree spatial index is determined. Based on traversing the ψR-tree, the event visualization module 210 may determine a node, such as a leaf node, corresponding to the selected road event type. In one embodiment, the determined node includes a linked list referring to the requested road event data, which may be stored in the event profile database 116.

At step 658, the requested road event data associated with the determined node is retrieved. The event visualization module 210 retrieves the road event data associated with the determined node corresponding to the selected event type. The road event data may be retrieved from the event profile database 116.

At step 660, a membership level of the user is retrieved. The event visualization module 210 may be configured to retrieve the membership level of the user 104 from his membership data stored in the user profile database 118. The membership level may be computed based on at least one of the retrieved road event data and a predefined ranking of the selected road event type by the membership management module 208.

At step 662, the retrieved road event data is overlaid on a map. The event visualization module 210 may communicate with the map database 120 to retrieve a map such as a street map, a topographic map, a heat map, a thematic map, etc. The event visualization module 210 may be configured to spatially overlay the retrieved road event data on the retrieved map. In some embodiments, the event visualization module 210 may prompt the user 104 to select a map from one or more maps stored in the map database 120 so that the retrieved road event data may be overlaid on the selected map. However, other embodiments may include the event visualization module 210 to automatically overlay the retrieved road event data on different maps.

Figure 8:
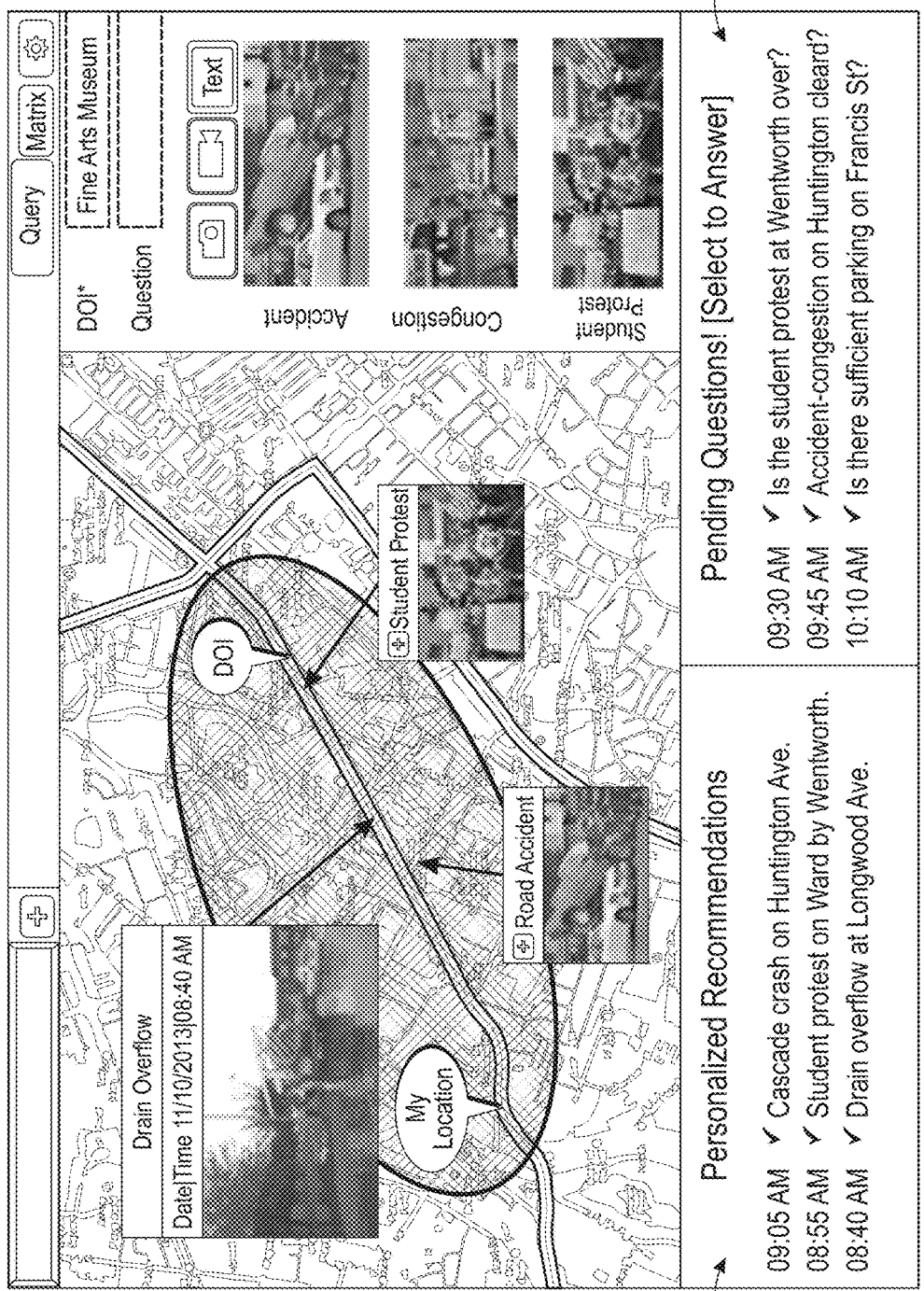
FIG. 8 is a snapshot of an exemplary display screen of the road event device illustrating exemplary visualization of the road event data embedded on a map based on the types of the event data selected in the FIG. 7B, according to an embodiment of the present disclosure.

At step 664, the overlaid map is displayed based on the retrieved membership level of the user. The event visualization module 210 may display a spatial region of the overlaid map, where the displayed spatial region may be predefined based on the retrieved membership level of the user 104. The membership level may range between predefined value ranges, e.g., from level '0' to level '4' to define a corresponding predefined spatial vision window for the user 104 as shown in FIG. 8, where level 0 may refer to the lowest level of user membership, and level 4 may refer to the highest level of user membership. Such spatial vision may assist the user 104 to more effectively make trip planning decisions based on the spatial vision window to see farther down the potential routes that the user 104 may prefer to adopt in view of various road events from the user's current location. The event visualization module 210 may retrieve the user's current location from the user profile database 118. Also, the event visualization module 210 may store the displayed overlaid maps in the user profile database 118 for future access by the user 104.

The overlaid maps and the user's current location may be updated continually or at regular intervals in small temporal durations, at the arrival of newer road events based on received new road event data, or at the time of user login, thereby in effect enabling a pseudo-real-time visualization of the road events. In addition to the above spatio-temporal overlay of the retrieved road event data on one or more maps, the event visualization module 210 may provide the user 104 with route-sensitive visualization of road events on the maps based on the travel direction of the user 104. As shown in FIG. 8, the event visualization module 210 may spatio-temporally overlay the retrieved road event data between a first location (e.g., the user's current location represent by 'My Location') and a second location (e.g., a destination of user's interest represented as 'DOI'), thereby facilitating the user 104 to make a subjective choice of routes.

At step 666, context-aware recommendations are provided based on the retrieved road event data and the selected road event type. As shown in FIG. 8, the context-aware recommendation module 208 may be configured to display context-aware recommendations 802 along with the displayed overlaid maps, or as a context-aware service, based on the road event data and the selected event type. Additionally, the context-aware recommendation module 212 may provide questions 804 that may be answered by the user 104, and the answers received from other users for that question such that the answers are of relevance to the user 104 based on the selected road event type, the road event data, and the user's recognized contextual patterns (e.g., location, time, profile preferences, etc.).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

What is claimed is:

1. A method for providing context-aware and personalized access to road event data corresponding to a road event to a user of a road event information device provided in a vehicle, the method comprising:
   receiving, by the road event information device, the road event data from at least one sensor configured to sense the road event as the vehicle travels along a travel route;
   associating, by the road event information device, location data received from a global positioning system (GPS) with the road event data received from the at least one sensor;
   analyzing, by the road event information device, the road event data including determining a classification type of the road event data and a quality of the road event data, and removing privacy information from the road event data;
   registering, by the road event information device, the road event data in a database by spatially indexing the road event data based on a hierarchical data structure, the hierarchical data structure including a first node representing a road event type, the first node being associated with a frequency of occurrence of the road event type, wherein the hierarchical data structure comprises linked lists for leaf nodes and non-leaf nodes, wherein a linked list for a particular non-leaf node comprises the frequency of occurrence for the road event type over a spatial region associated with the particular non-leaf node;
   receiving, by the road event information device, a request to access the road event data from the user;
   dynamically determining, by the road event information device, a membership level of the user based on a number of prior road event data submissions made by the user to the road event information device, and a predefined ranking of types of the road event data previously submitted by the user;
   creating, by the road event information device, a visualization of a portion of the road event data the user requested to access by overlaying the portion of the road event data on a map, the portion of the road event data being determined based on the membership level of the user;
   generating, by the road event information device, context-aware recommendations for the user based on the visualized portion of the road event data; and
   displaying, by the road event information device, the created visualization and generated context-aware recommendations to the user;
   wherein displaying the created visualization and generated context-aware recommendations includes displaying the created visualization and generated context-aware recommendations in a spatial vision window displayed on a display of the road event information device, wherein the spatial vision window changes its display size based on the dynamically determined membership level of the user.

2. The method of claim 1, wherein the hierarchical data structure is a tree data structure that includes a second node representing another road event type, the second node being a leaf node and associated with a frequency of occurrence of the another road event type, wherein the first node and the second node are sorted in decreasing order based on the frequency of occurrence of the respective road event types.

3. The method of claim 1, wherein spatially indexing the road event data links the road event type to a location of the road event data in the database.

4. The method of claim 1, wherein the road event is a road event including at least one of a pothole, a speed bump, a dysfunctional street lighting, a construction work, a road maintenance work, a crowd protest, an accident, waterlogging foggy condition, rainfall, and snowfall.

5. The method of claim 1, wherein the road event data includes at least one of image data, audio data, video data, biometric data, and textual data of the road event.

6. The method of claim 1, wherein the database stores at least one of event profiles, user profiles, and maps, and the maps include at least one of street maps, topographic maps, climate maps, thematic maps, or any combination thereof.

7. The method of claim 1, wherein a linked list for a non-leaf node comprises frequency of occurrence information for a plurality of road event types.

8. The method of claim 1, further comprising communicating with a server to retrieve information received from other users in other vehicles on the vehicle route, wherein the recommendations are based on the information received from other users.

9. A method for providing context-aware and personalized access to road event data corresponding to a road event to a user of a road event information device provided in a vehicle, the method comprising:
receiving, by the road event information device, a request to access the road event data from the user, the road event data being received from at least one sensor configured to sense the road event as the vehicle travels along a travel route and from other users of other road event information devices in other vehicles along the travel route;
determining, by the road event information device, a location for the road event based on global positioning system (GPS) data and associating the GPS data with the road event data;
traversing, by the road event information device, an R-tree spatial index including a plurality of nodes that represent at least one road event type, the R-tree comprising linked lists for leaf nodes and non-leaf nodes, wherein a linked list for a particular non-leaf node comprises frequency of occurrence for the road event type over a spatial region associated with the particular non-leaf node;
determining, by the road event information device, a node corresponding to the at least one road event type among the plurality of nodes, the determined node including a linked list that comprises information pertaining to the at least one road event type; and
accessing, by the road event information device, the requested data associated with the determined node;
dynamically determining, by the road event information device, a membership level of the user based on a number of prior road event data submissions made by the user to the road event information device, and a predefined ranking of types of the road event data previously submitted by the user;
creating, by the road event information device, a visualization of a portion of the road event data of the accessed data by overlaying the portion of the road event data on a map, the portion of the road event data being determined based on the membership level of the user;
generating, by the road event information device, context-aware recommendations for the user based on the visualized portion of the road event data;
and displaying, by the road event information device, the created visualization and generated context-aware recommendations to the user;
wherein displaying the created visualization and generated context-aware recommendations includes displaying the created visualization and generated context-aware recommendations in a spatial vision window displayed on a display of the road event information device, wherein the spatial vision window changes its display size based on the dynamically determined membership level of the user.

10. The method of claim 9, wherein the R-tree spatial index links the at least one road event type to a location of the requested data in the database.

11. The method of claim 9, wherein the road event is a road event including at least one of a pothole, a speed bump, a dysfunctional street lighting, a construction work, a road maintenance work, a crowd protest, an accident, waterlogging, foggy conditions, rainfall, and snowfall.

12. The method of claim 9, wherein the road event data is related to a plurality of predefined parameters including a location, date, time, and a classifier for the road event, wherein the classifier represents a status or an impact intensity of the road event.

13. The method of claim 9, wherein the road event data includes at least one of image data, audio data, video data, biometric data, textual data, or any combination thereof, and the database stores at least one of event profiles, user profiles, and maps.

14. The method of claim 9, wherein a linked list for a non-leaf node comprises frequency of occurrence information for a plurality of road event types.

15. The method of claim 14, wherein
the request comprises a request to access frequency of occurrence information for the road event type, and
the requested data is accessed from the linked list of the determined node.

16. A device for providing context-aware and personalized access to road event data corresponding to a road event to a user of the device provided in a vehicle, the device comprising:
a processor and a database including membership data for the user, at least one map, and road event profiles, the processor configured to receive the road event data from at least one sensor configured to sense the road event as the vehicle travels along a travel route, and the processor also configured to associate location data received from a global positioning system (GPS) with the road event data received from the at least one sensor; and
an event processing and visualization engine in communication with the processor configured to exchange the road event data corresponding to a road event type, the road event data being related to a plurality of predefined parameters including a location, date, time, and a classifier representing a status or an impact intensity of the road event, wherein the event processing and visualization engine includes:
an event pre-processing module configured to verify one or more characteristics of the road event data;
an event registration module configured to spatially index the verified road event data using an R-tree including a plurality of nodes, wherein the R-tree comprises linked lists for leaf nodes and non-leaf nodes, a linked list for a particular non-leaf node comprises frequency of occurrence for the road event type over a spatial region associated with the particular non-leaf node, and at least one node among the plurality of nodes corresponds to the road event type, a linked list for the at least one node comprising information pertaining to the road event type; and an event personalization module in communication with the processor configured to provide context-aware and personalized access to the road event data corresponding to the road event based on the road event type, the event personalization module comprising:

a membership management module configured to dynamically compute a membership level of the user registered in the database based on a number of prior road event data submissions made by the user to the device, and a predefined ranking of types of the road event data previously submitted by the user;

an event visualization module configured to:
retrieve the computed membership level of the user;
overlay a portion of the road event data on the at least one map, the portion being dynamically determined based on the dynamically determined membership level; and
display the overlaid map in a spatial vision window on a display of device, wherein the spatial vision window changes its display size based on the dynamically determined membership level of the user; and a recommendation module in communication with the processor configured to provide context-aware recommendations based on the portion of the road event data, wherein the recommendations are also displayed on the display of the device.

17. The device of claim 16, wherein the one or more characteristics of the road event data include at least one of completeness, authenticity, and duplicity of the road event data, wherein:

completeness of the road event data is verified by checking availability of the road event data for a set of parameters among a plurality of predefined parameters for the road event type;

authenticity of the road event data is verified by comparing a frequency of occurrence of the road event data associated with a first classifier for a particular location and a frequency of occurrence of the road event data associated with a second classifier for the same location, wherein the road event data is authentic if the number of occurrences of the road event data exceeds a threshold value; and duplicity of the road event data is verified based on multiple occurrences of the road event data for the same location.

18. The device of claim 16, wherein the at least one map includes a street map, a topographic map, a climate map, a thematic map, or a combination thereof.

19. The device of claim 16, wherein the road event is a road event including at least one of a pothole, a speed bump, a dysfunctional street lighting, a construction work, a road maintenance work, a crowd protest, an accident, waterlogging, foggy conditions, rainfall, and snowfall.

20. The device of claim 16, wherein the road event data includes at least one of image data, audio data, video data, biometric data, textual data of the road event.

21. The device of claim 16, wherein the membership data includes name, location, age, and the membership level of the user.

22. The device of claim 16, wherein the road event profiles include the road event data corresponding to the road event type.

23. The device of claim 16, wherein a linked list for a non-leaf node comprises frequency of occurrence information for a plurality of road event types.

24. The device of claim 23, wherein a linked listed for a non-leaf node that comprises frequency of occurrence information for a plurality of road event types is sorted in a descending order of frequency of occurrence.

* * * * *